United States Patent [19]

Andersen

[11] E Re. 30,112

[45] Reissued Oct. 16, 1979

[54] APPARATUS AND METHOD FOR CANNING FOOD

[75] Inventor: Ariel A. Andersen, Provo, Utah

[73] Assignee: Phillip V. Christensen, Provo, Utah ; Trustee for the Foundation for Indian Development, Inc.

[21] Appl. No.: 932,886

[22] Filed: Aug. 10, 1978

Related U.S. Patent Documents

Reissue of:

[64] Patent No.: 3,973,480
Issued: Aug. 10, 1976
Appl. No.: 469,544
Filed: May 13, 1974

[51] Int. Cl.[2] ..... A23L 3/10

[52] U.S. Cl. ..... 99/359; 126/369; 126/389

[58] Field of Search ..... 99/331, 359, 450, 446, 99/467, 473, 481–483, 516; 126/369, 389

[56] References Cited

U.S. PATENT DOCUMENTS

| | | | |
|---|---|---|---|
| 1,673,164 | 6/1928 | Silen | 99/450 X |
| 1,748,741 | 2/1930 | Tanaki | 99/446 X |
| 2,849,945 | 9/1958 | Crowley | 99/450 X |
| 3,098,918 | 7/1963 | Koci | 99/331 UX |
| 3,489,075 | 1/1970 | O'Reilly | 99/450 |
| 3,786,741 | 1/1974 | Plumley | 99/467 |
| 4,106,486 | 8/1978 | Lee | 126/369 |

*Primary Examiner*—Leonard D. Christian
*Attorney, Agent, or Firm*—Lynn G. Foster

[57] ABSTRACT

An apparatus for *and method of* canning fruit and the like. The apparatus of the present invention comprises a platform having a plurality of legs thereon for placing it in a frying pan or other pan with the platform extending contiguous to the sides of the frying pan so that water placed in the frying pan will generate steam which will pass through holes in the platform. The platform is provided with a removable chamber which encloses a plurality of containers within the chamber and the chamber is provided with an outlet opening in the bottom thereof. The legs extending from the platform may also be passages for the admission of condensed steam back to frying pan and the holes in the platform may be provided with tubular passage means extending into the steam chamber.

6 Claims, 4 Drawing Figures

APPARATUS AND METHOD FOR CANNING FOOD

Matter enclosed in heavy brackets [ ] appears in the original patent but forms no part of this reissue specification; matter printed in italics indicates the additions made by reissue.

The present invention relates to an apparatus for canning fruit, tomatoes and the like in which the fruit is disposed in a sealed container and the containers are disposed in a steam chamber and the chamber is placed on the platform in the frying pan or other pan containing water which is supplied with heat so as to generate steam vapor in the chamber until sufficient time has elapsed for proper sterilization of the fruit within the containers.

It is [another] *an* object of the present invention to provide an apparatus of compact and simplified construction which can be utilized with a frying pan or other conventional cooking apparatus for canning fruits, tomatoes and the like.

It is yet another object of the present invention to provide a canning device which can be readily placed in a frying pan and has support legs thereon and opening or tubes for permitting steam to enter the steam chamber from a reservoir of water in the frying pan, and in which the steam generated enters the steam chamber of the device and is emitted therefrom by an aperture or outlet hole in the lower portion of the steam chamber so that the canning device of the present invention heats with substantially pure steam, unmixed with air, which completely fills the cooking chamber from the top down and pushes the air out of the chamber at a low point in the chamber without mixing it with the steam during the canning process.

It is yet another object of the present invention to provide a simplified and economical canning device for use with conventional frying pan or other cooking means which utilizes a minimum amount of water and cooking time in canning the fruit or tomatoes.

It is yet another object of the present invention to provide a canning device with outlet means in the bottom thereof so that when the cooking process is completed air is allowed to reenter the steam chamber when it cools down thereby preventing a vacuum therein.

It is yet another object of the present invention to provide a canning device that is readily utilized with a conventional frying pan or other heating means in which the cover of the steam chamber and the steam chamber are easily removed from the cooking apparatus without danger of explosive conditions and pressure.

Various other objects and advantages of the present invention will be readily apparent from the following detailed description when considered in connection with the accompanying drawings forming a part thereof and in which.

Figure 1:
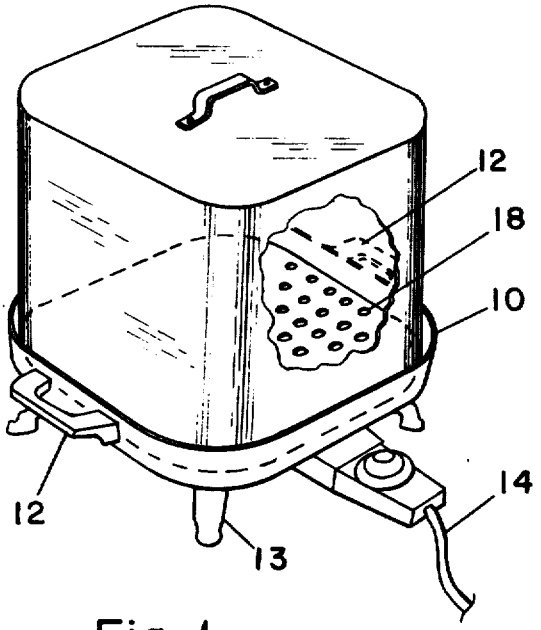
FIG. 1 is a perspective view illustrating [the] *a* canning device [embodied in] *according to* the present invention.

Referring to the drawings the reference numeral 10 generally designates a conventional electric frying pan having handles 12 thereon and legs 13 thereon. The frying pan is also provided with a detachable electrical plug 14 for plugging in the electric frying pan with a source of heat or energy.

Figure 2:
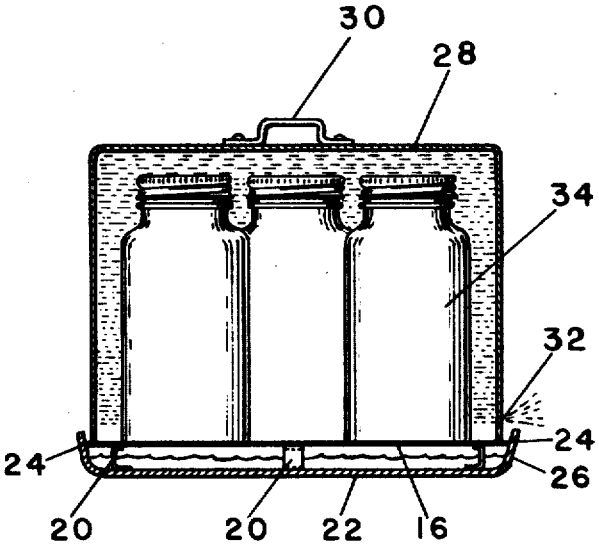
FIG. 2 is a [side elevational] *cross sectional* view of the canning device of [the present invention] *FIG. 1;*

Referring to FIG. 2, the canning device of the present invention is provided with a horizontal platform 16 having a plurality of apertures or openings 18 therein through which steam is emitted from the frying pan, as described hereinafter. The platform 16 is provided with a plurality of L-shaped legs 20 on the bottom thereof supporting the platform in space relationship with the bottom 22 of the pan. The opposite edges 24 of the platform are disposed in a contiguous relationship to the sidewalls 26 of the frying pan so that steam generated in the frying pan will pass through the apertures 18 of the platform. A substantially rectangular chamber 28 is disposed on the platform and has its lower edges disposed adjacent the edges 24 of the platform. The chamber 28 is completely closed and is provided with a handle 30 thereon for placing it on the platform. The only opening to the outside in the steam chamber 28 is a small aperture or outlet hole 32 in the bottom permitting air and then steam to escape. The chamber is of sufficient size to permit a number of jars or containers 34 to be disposed within the chamber 28 so as to hold the food it is desired to preserve therein.

In using the present invention the fruit or tomatoes or food to be canned is placed in the jars of containers 34 as desired and sealed. Thereafter a small amount of water is placed in the bottom of the frying pan and the frying pan is placed on a heating element, or the heating element is energized. The platform 16 is then placed in the frying pan and the jars 34 of fruit are then placed on the platform. The steam chamber 28 is then placed over the fruit jars and onto the platform. After a few minutes the steam will have pushed the air out of the outlet hole and steam will start coming out of the outlet hole 32. The cooking process may be best timed from the instant that steam starts coming out. After enough cooking time is allowed the heat may be turned off and the device will soon cool off because of the small amount of water involved. The outlet hole 32 allows air to re-enter when the steam stops, thereby preventing a vacuum. The steam chamber 28 is easily removed without danger of explosive conditions and pressure and the fruit jars are then easily moved to storage cabinets.

Figure 3:
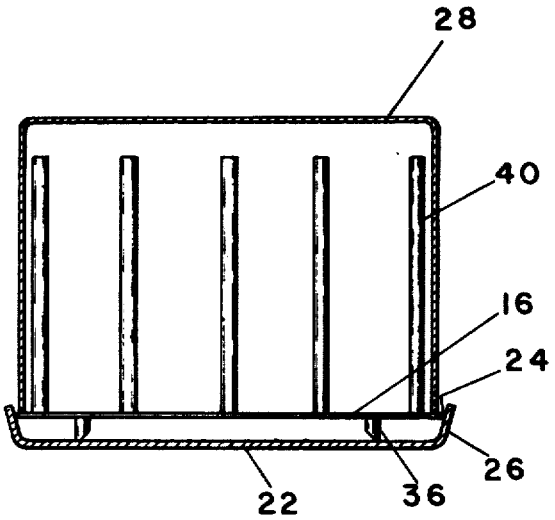
FIG. 3 is a [side elevational] *cross sectional* view of a [modification of the] *second* canning device [of] *according to* the present invention.
Figure 4:
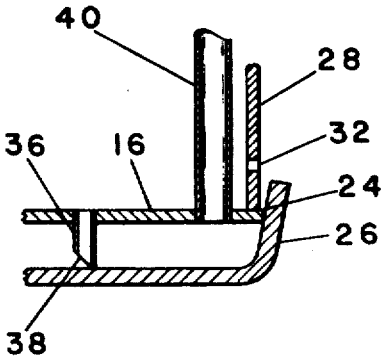
FIG. 4 is a fragmentary enlarged [detailed] *cross sectional* view of the [embodiment of the invention] *device* shown in FIG. 3.

Referring to the embodiment of the invention shown in FIGS. 3 and 4 this is substantially the same in structure and operation as that already described in connection with the invention of FIGS. 1 and 2, except that some of the apertures or openings in the platform 16 are provided with small drain tubes or pipes 36 secured thereto with a sloped bottom opening indicated at 38 with these tubes acting as the legs or supports for the platform 16. The provisions of these sloped opened pipes or tubes enable the condensation of the steam to reenter the portion of the frying pan below the platform.

It will also be noted that in this platform 16 the openings of the platform of FIG. 2 are replaced with a plurality of elongated tubes or pipes 40 having their lower ends secured thereto and extending upwardly into the steam chamber 28 in spaced relationship with the top of the steam chamber. This enables the steam to be carried quickly to the top of the steam chamber when the canning device is in operation.

From the foregoing description, it is apparent that the present invention provides as novel compact and simplified apparatus for canning fruits, tomatoes and the like which can be quickly utilized with conventional frying pans, cooking elements or apparatus and the like.

Various changes in the location of the several parts may be made without departing from the scope of the invention and it is not meant to limit the scope of the invention except by the following claims.

What is claimed is:

1. An apparatus for canning food and the like comprising a platform with openings in the bottom thereof for receiving steam therethrough, frying pan means for receiving said platform therein; leg means on said platform for supporting it in spaced relationship with said frying pan means and cover means forming a chamber above said platform and detachably supported on said platform for receiving a container of food to be canned, and outlet means in the bottom portion of said chamber to permit air and steam to escape therefrom, said leg means comprising pipes secured to some of said openings and having sloped cut lower ends to permit condensed steam to be carried back to said pan means and other pipes secured to other openings in said pan extending upwardly into said cover means adjacent the top thereof for carrying steam therein.

2. The apparatus of claim 1 wherein said pan comprises an electric frying pan.

3. The apparatus of claim 1 wherein said chamber is of substantially rectangular configuration.

4. The apparatus of claim 1 wherein said chamber, and frying pan are round.

*5. An apparatus for canning food and the like comprising:*

*pan means comprising a dish-shaped liquid tight horizontal bottom adapted to communicate heat therethrough, an open horizontal top and a narrow vertical dimension;*

*platform means carried horizontally within the pan means, the platform means having steam flow accommodating aperture means therein and comprising a thin planar top upon which containers of food to be steam cooked are adapted to rest, the peripheral edge of the thin planar top and the interior surface of the pan means between the top and bottom of the pan means defining a contiguously tight interface throughout;*

*the lower surface of the thin planar top of the platform means and the upper surface of the bottom of the pan means defining therebetween a vertically narrow water receiving reservoir;*

*vertically elongated cover means in part defining a chamber above the top of the platform means in which said containers of food to be steam cooked are placed, the cover means having bottom edge means contiguous with the lower part of the apparatus so that steam elevating through the aperture means in the platform means is substantially trapped within the chamber; and*

*air and steam discharge port means disposed immediately above the water receiving reservoir, the port means accommodating restricted discharge of (a) air under force of elevated steam and (b) thereafter steam directly from the chamber to the atmosphere.*

*6. A method of steam cooking containers of food to be preserved comprising the steps of:*

*placing containers of food to be preserved upon a vented platform which platform is disposed above a pan a relatively small distance, the weight of the containers being transferred from the platform to the pan;*

*placing a thin layer of water in the pan below the platform;*

*placing a cover over the containers of food to be preserved so that gaseous communication between the interior of the pan and the interior of the cover is, during normal use, restricted to the vents in the platform;*

*applying heat to the pan causing vaporization of water contained within the pan, followed by elevation of the steam through the vents of the platform to the top of the interior of the cover, the elevated steam initially downwardly and outwardly exhausting air from within the cover to the atmosphere solely immediately above the platform and steam thereafter being discharged to the atmosphere solely immediately above the platform, the amount of steam discharged to the atmosphere being controlled and substantially restricted in magnitude; whereby*

*steam cooking the food of the containers housed within the cover above the platform is achieved.*

* * * * *